United States Patent
Brongers et al.

(10) Patent No.: US 12,149,716 B2
(45) Date of Patent: Nov. 19, 2024

(54) CONTRASTIVE OBJECT REPRESENTATION LEARNING FROM TEMPORAL DATA

(71) Applicant: QUALCOMM Technologies, Inc., San Diego, CA (US)

(72) Inventors: Frank Brongers, Amsterdam (NL); Phillip Lippe, Amsterdam (NL); Sara Magliacane, Amsterdam (NL)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

(21) Appl. No.: 17/681,675

(22) Filed: Feb. 25, 2022

(65) Prior Publication Data

US 2023/0308666 A1  Sep. 28, 2023

(51) Int. Cl.
| | |
|---|---|
| *H04N 19/20* | (2014.01) |
| *G06V 10/776* | (2022.01) |
| *G06V 10/82* | (2022.01) |
| *G06V 20/40* | (2022.01) |
| *H04N 19/136* | (2014.01) |
| *H04N 19/436* | (2014.01) |

(52) U.S. Cl.
CPC .......... *H04N 19/20* (2014.11); *G06V 10/776* (2022.01); *G06V 10/82* (2022.01); *G06V 20/41* (2022.01); *H04N 19/436* (2014.11)

(58) Field of Classification Search
None
See application file for complete search history.

(56) References Cited

U.S. PATENT DOCUMENTS

| | | | |
|---|---|---|---|
| 2017/0255832 A1* | 9/2017 | Jones | G06V 10/454 |
| 2020/0034627 A1* | 1/2020 | Zhu | G06V 10/764 |
| 2022/0036635 A1* | 2/2022 | Li | G06T 7/579 |
| 2023/0024101 A1* | 1/2023 | de Haan | G05B 19/41835 |
| 2023/0025238 A1* | 1/2023 | Rudolph | G06N 3/0464 |
| 2023/0344962 A1* | 10/2023 | Tran | G06T 3/4023 |
| 2024/0056576 A1* | 2/2024 | Besenbruch | H04N 19/13 |

OTHER PUBLICATIONS

Bellemare M.G., et al., "The Arcade Learning Environment: An Evaluation Platform for General Agents", 2013, pp. 253-279.
Burgess C.P., et al., "MONet: Unsupervised Scene Decomposition and Representation", arXiv:1901.11390v1 [cs.CV] Jan. 22, 2019, pp. 1-22.
Chen T., et al., "A Simple Framework for Contrastive Learning of Visual Representations", arxiv.org, Cornell University Library, 201 Olin Library Cornell University, Ithaca, NY, 14853, Jul. 1, 2020 (Jul. 1, 2020), XP081705712, 20 Pages, the whole document.

(Continued)

*Primary Examiner* — Samuel D Fereja
(74) *Attorney, Agent, or Firm* — QUALCOMM Technologies, Inc.

(57) ABSTRACT

A computer-implemented method for contrastive object representation from temporal data using an artificial neural network (ANN) includes receiving, by the ANN, a video. The video comprises a temporal sequence of frames including images of one or more objects. The ANN generates object representations corresponding to the one or more objects based on temporal data of multiple frames of the temporal sequence of frames. The object representations are communicated to a receiver.

14 Claims, 10 Drawing Sheets

(56) References Cited

OTHER PUBLICATIONS

Engelcke M., et al., "Genesis: Generative Scene Inference and Sampling with Object-Centric Latent Representations", arXiv:1907.13052v4 [cs.LG] Nov. 23, 2020, pp. 1-17.
Fan D.P., et al., "Camouflaged Object Detection", 2020, pp. 2777-2787.
Greff K., et al., "Multi-Object Representation Learning with Iterative Variational Inference", Proceedings of the 36th International Conference on Machine Learning, Long Beach, California, PMLR 97, 2019, 10 Pages.
Hall J.R., et al., "Camouflage, Detection and Identification of Moving Targets", Proceedings of the Royal Society, Feb. 19, 2013, pp. 1-7.
Hochreiter S., et al., "Long Short-Term Memory", Neural Computation, vol. 9, Issue 8, 1735-1780, Nov. 15, 1997, pp. 1-32.
Ji G.P., et al., "Fast Camouflaged Object Detection via Edge-Based Reversible Re-calibration Network", Oct. 31, 2021, pp. 1-12.
Kabra R., et al., "SIMONe: View-Invariant, Temporally-Abstracted Object Representations via Unsupervised Video Decomposition", 35th Conference on Neural Information Processing Systems (NeurIPS 2021), 2021, pp. 1-14.
Karazija L., et al., "CLEVRTEX: A Texture-Rich Benchmark for Unsupervised Multi-Object Segmentation", 35th Conference on Neural Information Processing Systems (NeurIPS 2021) Track on Datasets and Benchmarks, arXiv:2111.10265v1 [cs.CV] Nov. 19, 2021, pp. 1-26.
Kingma D.P., et al., "ADAM: A Method for Stochastic Optimization", arXiv:1412.6980v9 [cs.LG], Jan. 30, 2017, International Conference for Learning Representations, 2014, pp. 1-15.
Kipf T., et al., "Conditional Object-Centric Learning from Video", arXiv:2111.12594v1 [cs.CV] Nov. 24, 2021, pp. 1-32.
Kipf T., et al., "Contrastive Learning of Structured World Models", arXiv: 1911.12247v2 [stat.ML] Jan. 5, 2020, pp. 1-21.
Koffka K.,"Principles of Gestalt Psychology", The International Library of Psychology, 1935, 52 Pages.
Lin Z., et al., "Space: Unsupervised Object-Oriented Scene Representation via Spatial Attention and Decomposition", arXiv:2001.02407v3 [cs.LG] Mar. 15, 2020, pp. 1-22.
Locatello F., et al., "Object-Centric Learning with Slot Attention", 34th Conference on Neural Information Processing Systems (NeurIPS 2020), Vancouver, Canada, 2020, pp. 1-14.
Lowe S., et al., "Learning Object-Centric Video Models by Contrasting Sets", NeurIPS 2020 Workshop on Object Representations for Learning and Reasoning, Vancouver, Canada, arXiv:2011.10287v1 [cs.CV] Nov. 20, 2020, pp. 1-11.
Oord A., et al., "Representation Learning with Contrastive Predictive Coding", arXiv:1807.03748v2 [cs.LG] Jan. 22, 2019, pp. 1-13.
Shi X., et al., "Convolutional LSTM Network: A Machine Learning Approach for Precipitation Nowcasting," Sep. 19, 2015 (Sep. 19, 2015), XP055368436, Retrieved from the Internet: URL:https://arxiv.org/pdf/1506.04214.pdf, 12 pages, [retrieved on May 2, 2017].
Xiang M., et al., "Exploring Depth Contribution for Camouflaged Object Detection", arXiv:2106.13217v3 [cs.CV] Jan. 13, 2022, 11 Pages.

* cited by examiner

Setup: Obtaining a dataset of sequences from the dynamical system and create positive and negative example pairs based on location —702

Training: Optimizing the encoder via the contrastive loss on provided dataset —704

Inference: Using the encoder, extract object-centric representations from sequences —706

*FIG. 7*

CONTRASTIVE OBJECT REPRESENTATION LEARNING FROM TEMPORAL DATA

FIELD OF THE DISCLOSURE

Aspects of the present disclosure generally relate to object-centric representation learning.

BACKGROUND

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, speech recognition, acoustic scene classification, keyword spotting, autonomous driving, and other classification tasks.

In object-centric representation learning, most conventional approaches focus on reconstruction and process temporal information at the representation level. However, this may lead to settings in which an object might be missed, for instance, if the object is small or if the object is camouflaged, hidden by or hard to distinguish from the background environment. Small objects may have too little of an effect on the reconstruction loss, which may lead to localization errors. On the other hand, objects that are camouflaged or difficult to distinguish from the background environment or other objects may be difficult to reconstruct and may be undetectable in static frames.

SUMMARY

The present disclosure is set forth in the independent claims, respectively. Some aspects of the disclosure are described in the dependent claims.

In an aspect of the present disclosure, a computer-implemented method includes receiving, by an artificial neural network (ANN), a video. The video includes a temporal sequence of frames including images of one or more objects. The method also includes generating, by the ANN, object representations corresponding to the one or more objects based on temporal data of multiple frames of the temporal sequence of frames. The method further includes communicating the object representations to a receiver.

In an aspect of the present disclosure, a computer-implemented method is presented. The computer-implemented method includes receiving, by an artificial neural network (ANN), object representations corresponding to one or more objects included in a video, the object representations being generated based on temporal data of multiple frames of the temporal sequence of frames. The method further includes decoding, by the ANN, the object representations based on temporal data of multiple frames of the temporal sequence of frames. The method still further includes generating, by the ANN, a reconstruction of the temporal sequence of frames.

Another aspect of the present disclosure is directed to an apparatus having a memory and one or more processors coupled to the memory. The processor(s) is configured to receive, by an artificial neural network (ANN), a video. The video includes a temporal sequence of frames including images of one or more objects. The processor(s) is also configured to generate, by the ANN, object representations corresponding to the one or more objects based on temporal data of multiple frames of the temporal sequence of frames. The processor(s) are further configured to communicate the object representations to a receiver.

Another aspect of the present disclosure is directed to an apparatus having a memory and one or more processors coupled to the memory. The processor(s) is configured to receive, by an artificial neural network (ANN), object representations corresponding to one or more objects included in a video. The object representations are generated based on temporal data of multiple frames of the temporal sequence of frames. The processor(s) is also configured to decode, by the ANN, the object representations based on temporal data of multiple frames of the temporal sequence of frames. The processor(s) is further configured to generate, by the ANN, a reconstruction of the temporal sequence of frames.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 7 is a flow diagram illustrating an example process for providing contrastive object-centric representation from temporal data, in accordance with aspects of the present disclosure.

DETAILED DESCRIPTION

Figure 1:
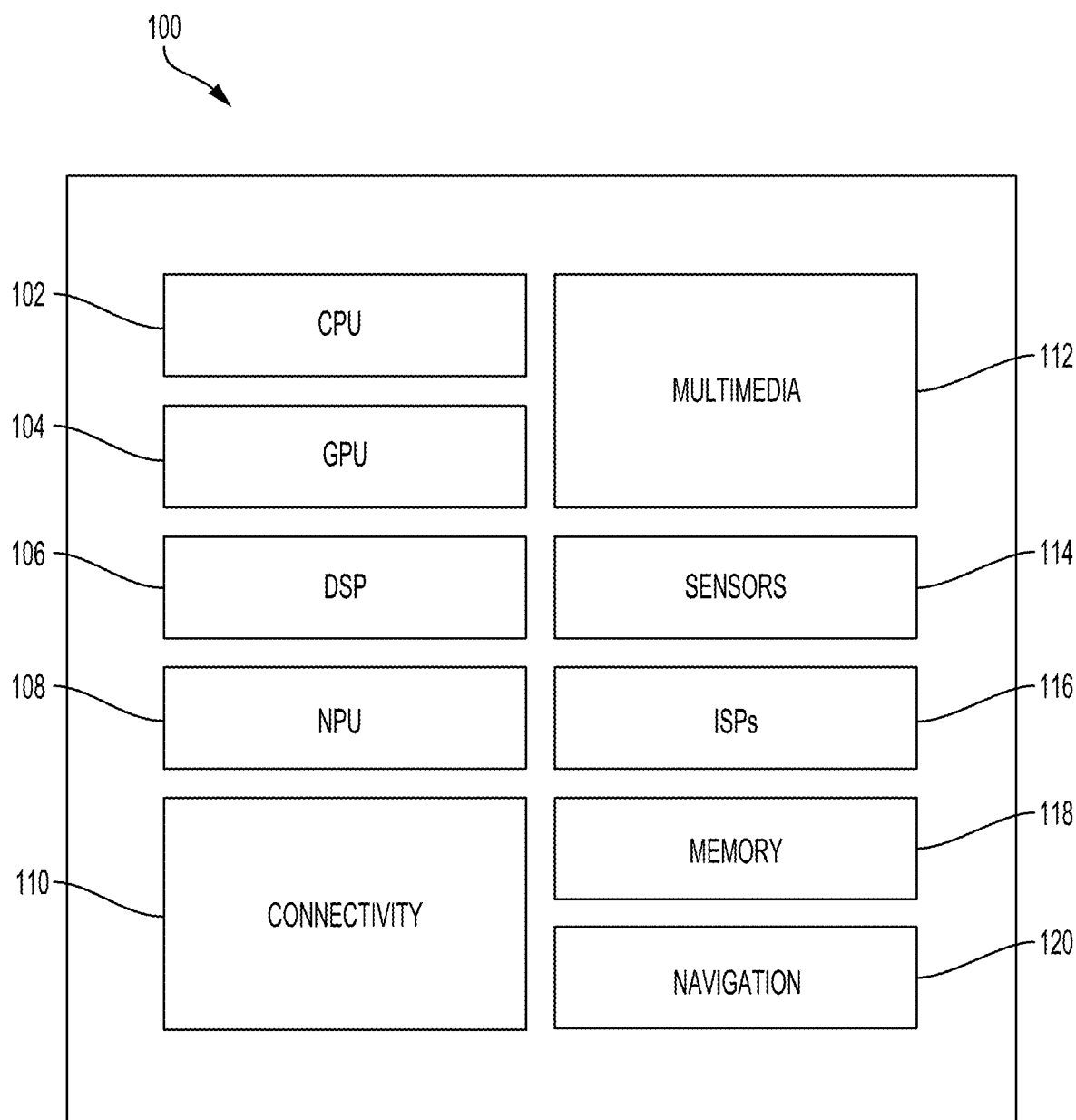
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, in object-centric representation learning, most conventional approaches focus on reconstruction and process temporal information at the representation level. However, this may lead to settings in which an object might be missed, for instance, if the object is small or if the object is camouflaged, hidden by or hard to distinguish from the background environment. Small objects may have too little of an effect on the reconstruction loss, which may lead to localization errors. On the other hand, objects that are camouflaged or difficult to distinguish from the background environment or other objects may be difficult to reconstruct and may be undetectable in static frames.

There has been a recent interest in developing unsupervised object-centric representation learning methods. In these approaches, a latent space encodes and disentangles information of objects in the environment, which may allow neural networks to directly work on an abstracted object level. However, such conventional approaches generally consider detecting objects from single, static images, which may be a considerable limiting factor. For example, from a single image, it is difficult to distinguish between actual objects in an environment and objects that are shown on a picture in the environment. Furthermore, objects may be camouflaged in the environment. That is, camouflaged objects may refer to objects having a similar appearance to the background environment or that are otherwise difficult to distinguish from the background environment. As a result, camouflaged objects may be difficult to detect from static images.

To address these and other challenges, aspects of the present disclosure are directed to contrastive object-centric representation learning from temporal data (CORT). In accordance with aspects of the present disclosure, temporal information may be integrated in an early stage of object-centric representation, learning to enable detection of objects from their motion. Additionally, an artificial neural network model may be trained via contrastive learning instead of reconstruction loss employed in conventional techniques. Reconstructing an image has shown to perform sub-optimally on small objects (e.g., a 4 pixels object in a 32 pixel×32 pixel image) or objects with diverse textures, which may become even more challenging for camouflaged objects where their differences to the background may be marginal. Furthermore, the present disclosure may also be applied to increase detection, and in turn inferences related to objects that may be hidden or partially occluded by other objects in the environment.

FIG. 1 illustrates an example implementation of a system-on-a-chip (SOC) 100, which may include a central processing unit (CPU) 102 or a multi-core CPU configured for contrastive object-centric representation using an artificial neural network. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive, by the ANN, a video, the video comprising a temporal sequence of frames including images of one or more objects. The general-purpose processor 102 may also include code to generate, by the ANN, object representations corresponding to the one or more objects based on temporal data of multiple frames of the temporal sequence of frames. The general-purpose processor 102 may further include code to communicate the object representations to a receiver.

In another aspect of the present disclosure, the instructions loaded into the general-purpose processor 102 may include code to receive, by the ANN, object representations corresponding to one or more objects included in a video. The object representations are generated based on temporal data of multiple frames of the temporal sequence of frames. The general-purpose processor 102 may also include code to decode, by the ANN, the object representations based on temporal data of multiple frames of the temporal sequence of frames. The general-purpose processor 102 may further include code to generate, by the ANN, a reconstruction of the temporal sequence of frames.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
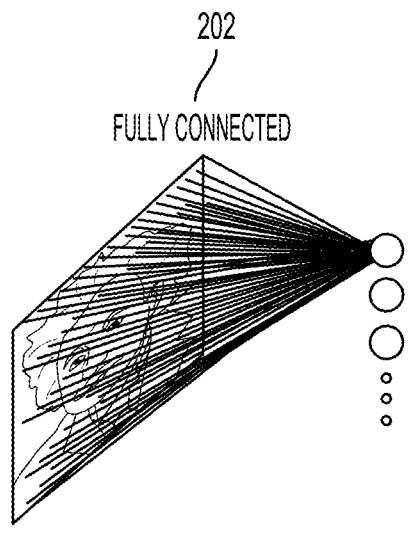
FIGS. 2A, 2B, and 2C are diagrams illustrating a neural network in accordance with aspects of the present disclosure.
Figure 2B:
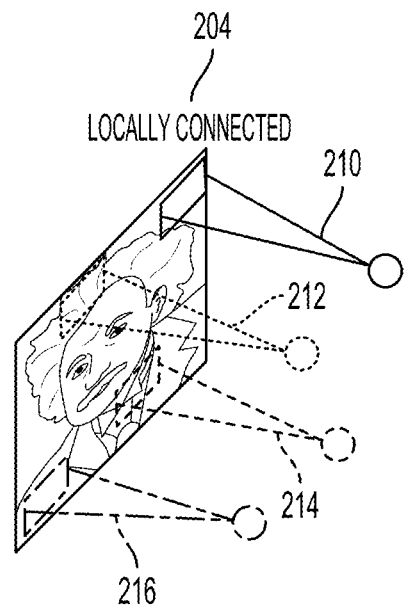

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
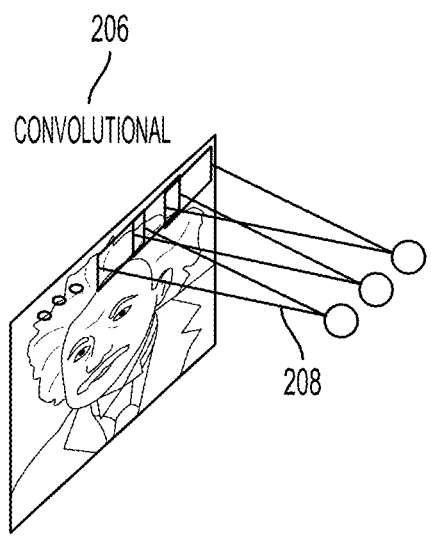

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
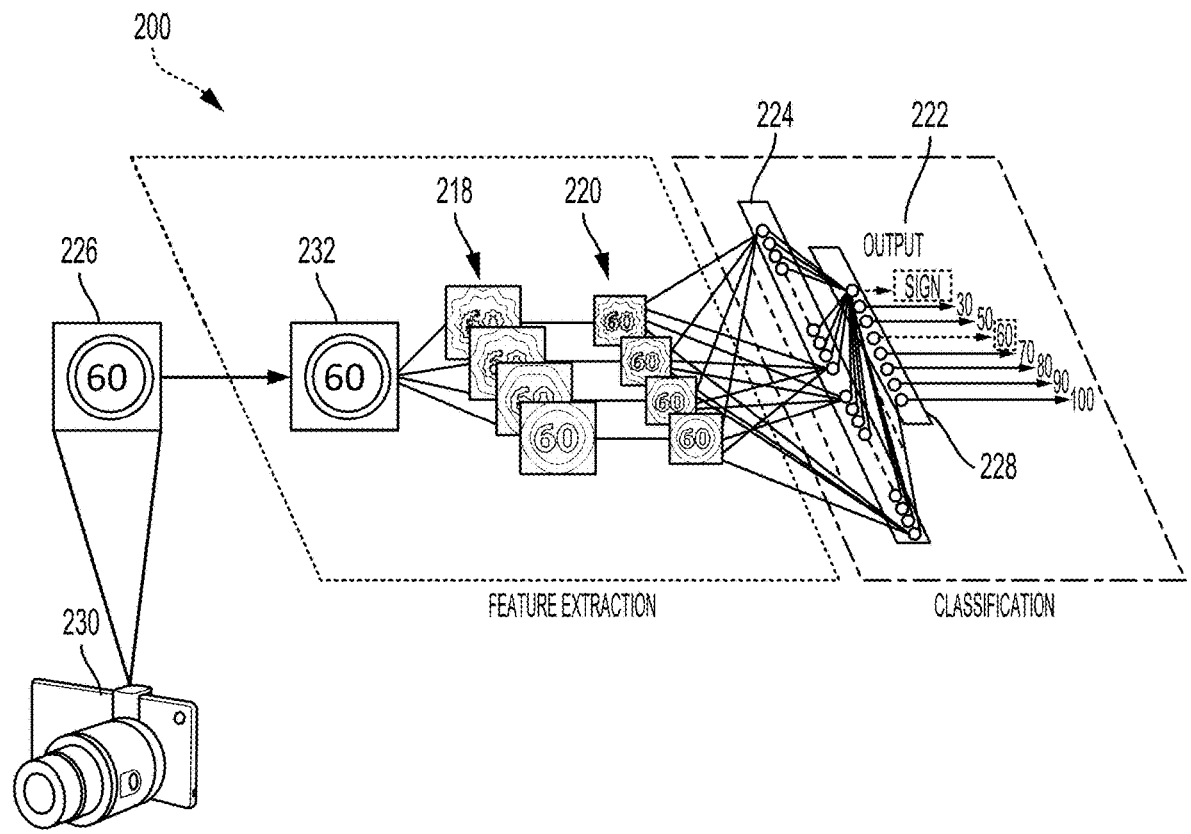
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
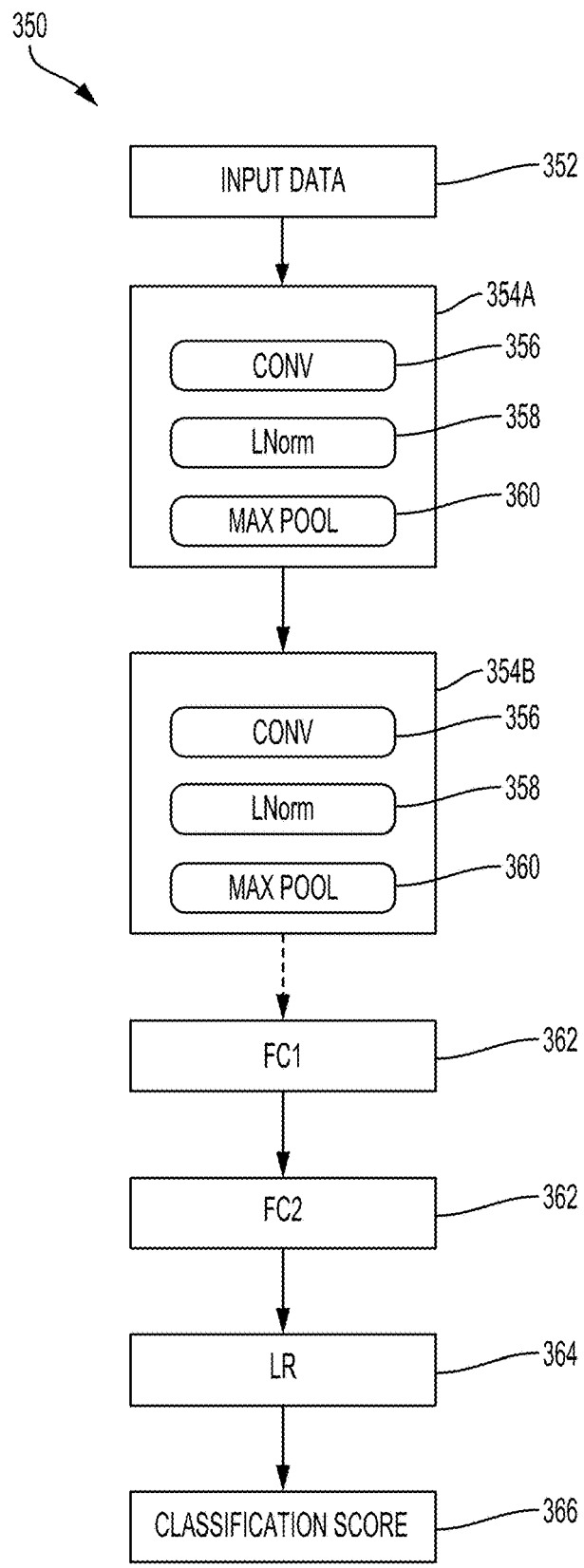
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
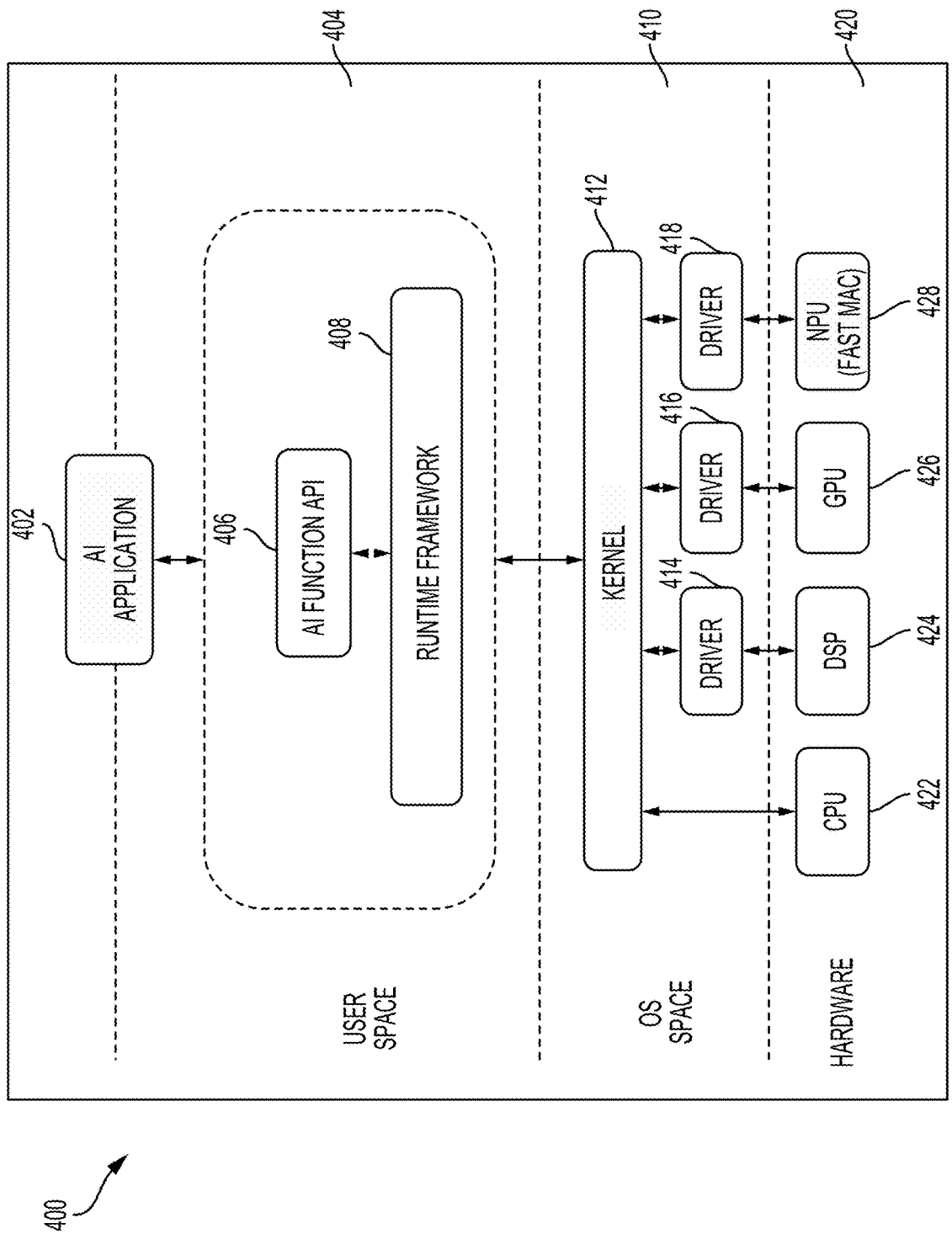
FIG. 4 is a block diagram illustrating an exemplary software architecture 400 that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example, a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

As described, aspects of the present disclosure are directed to contrastive object-centric representation learning from temporal data (CORT). In accordance with aspects of the present disclosure, temporal information may be integrated in an early stage of object-centric representation, learning to enable detection of objects from their motion. Additionally, an artificial neural network model may be trained via contrastive learning instead of reconstruction loss employed in conventional techniques. Reconstructing an image has shown to perform sub-optimally on small objects (e.g., a 4 2 pixel×2 pixel object in a 32 pixel×32 pixel image) or objects with diverse textures, which may become even more challenging for camouflaged objects where their differences to the background may be marginal. Furthermore, the present disclosure may also be applied to increase detection, and in turn inferences related to objects that may be hidden or partially occluded by other objects in the environment.

In contrast to conventional approaches, temporal information may be integrated at an early stage. This may be beneficial for objects that may, for example, only be reliably detected from movements, such as camouflaged objects. Typically, conventional approaches utilize a convolutional encoder, which extracts features from an input image based on which object representations are determined without regard to the temporal nature of the input data. However, aspects the present disclosure introduce a temporal aspect in encoders, which is applicable to almost any current object-centric method.

Figure 5:
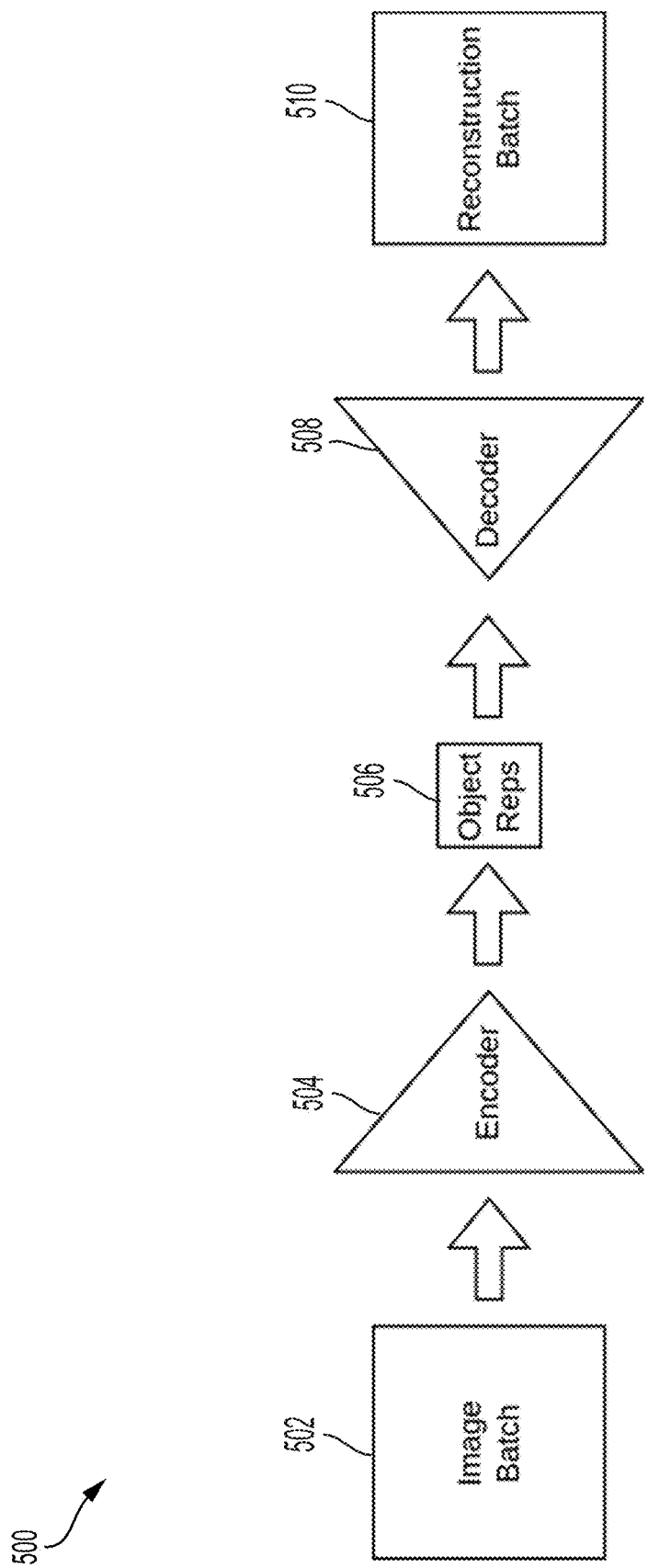
FIG. 5 is a block diagram illustrating an example architecture for processing temporal sequence data, in accordance with aspects of the present disclosure.

FIG. 5 is a block diagram illustrating an example architecture 500 for processing temporal sequence data, in accordance with aspects of the present disclosure. Referring to FIG. 5, the example architecture 500 includes an encoder 504 and a decoder 508. The encoder 504 may receive an input 502. The input 502 may be temporal sequence of frames such as a batch of images of a video, for example. The encoder 504 may be a convolutional neural network (CNN), for example. The encoder 504 may process the input 502 to produce object representations 506 corresponding to the input 502. The object representations 506 may be transmitted to the decoder 508. The decoder 508 may be configured in a reciprocal manner relative to the encoder 504. As such, the decoder 508 may process the received object representations 506 to generate a reconstruction 510 of the input 502 (e.g., a temporal sequence, such as a video).

Figure 6:
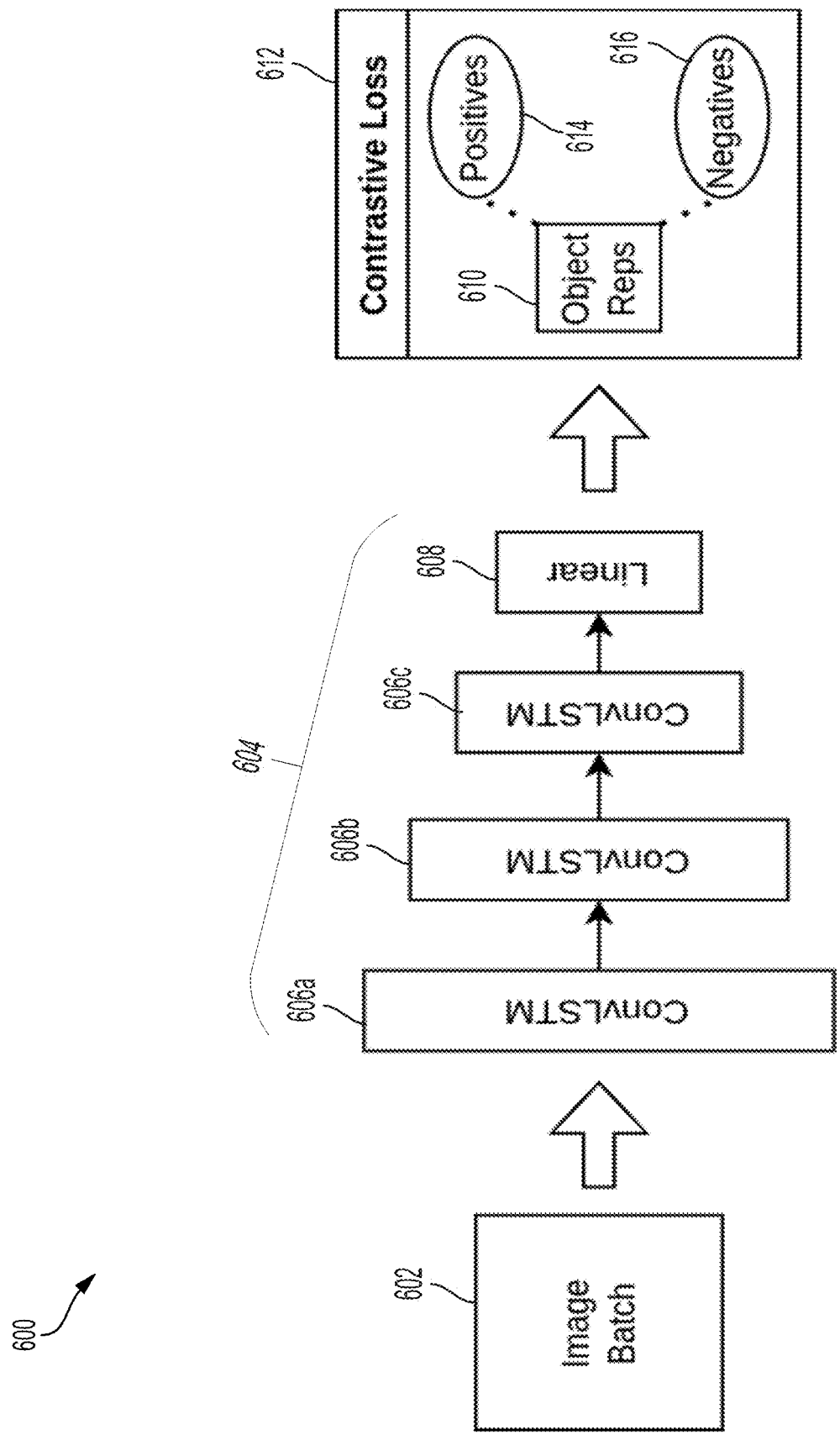
FIG. 6 is a block diagram illustrating an example encoder for contrastive object-centric representation from temporal data, in accordance with aspects of the present disclosure.

FIG. 6 is a block diagram illustrating an example architecture 600 for contrastive object-centric representation from temporal data, in accordance with aspects of the present disclosure. The architecture 600 may include some elements that correspond to elements of architecture 500 of FIG. 5, respectively. Referring to FIG. 6, the architecture 600 may include an encoder 604. The encoder 604 may receive an input 602. The input 602 may comprise a temporal sequence of frames, such as a batch of images of a video.

The encoder 604 may be configured with successive layers of convolutional long short-term memory (ConvLSTM) 604a-c. In the example of FIG. 6, three ConvLSTMs (e.g., 604a-c) are shown. However, this is merely an example and any number of ConvLSTM layers may be included according to design preference, for instance. The ConvLSTMs 604a-c integrate temporal information in the encoder 604 to enable the encoder 604 to generate an object-centric representation for temporal sequence data 602, such as a batch of images of a video. That is, the ConvLSTMs 606a-c are convolutional recurrent layers that capture data over time such that the layers may take advantage of the prior sequence data processing to more accurately generate object representations later in the sequence data. For example, the video may be a temporal sequence of frames, each frame including an image. The ConvLSTMs 606a-c may utilize information of one or more previous frames of the video to generate object representations for a current frame of the video. By incorporating the ConvLSTMs 606a-c in the encoder 604, the encoder 604 may determine a relationship between frames and extract temporal shifts of features between such frames, thereby finding movements over time, for instance.

The encoder 604 may also include a linear layer 608, which flattens the outputs of the ConvLSTMs to a one-dimensional tensor to produce the object representations 610. The object representations 610 may, in turn, be transmitted to a receiver (e.g., decoder 508 shown in FIG. 5). The receiver (e.g., decoder 508) may be configured in reciprocal fashion to decode the object representations 610 produced by the encoder 604 to generate a reconstruction of the input 602.

Although, the encoder 604, in the example of FIG. 6, has been described with ConvLSTMs (604a-c), the present disclosure is not so limiting. Rather, the encoder 604 may also be configured with convolutional recurrent neural network layers. Furthermore, in some aspects, the encoder 604 may alternatively be configured with a frame stacking architecture. Frame stacking architectures add the previous frame as an additional input for each input frame (e.g., the current frame). As such, the encoder (e.g., 604) can reason about the relation between the two frames and extract temporal shifts of features, thereby finding movements over time, for instance. A benefit of this approach is that it can be integrated into object-centric learning architectures. However, the model architecture of the frame stacking approach may be fixed to a specific number of input frames.

One common training objective for unsupervised object-centric representation learning is to reconstruct the original input images based on the learned representations. However, reconstruction loss naturally weights objects of larger size and distinct colors as more important, although in many situations, this is not desired. For instance, for small objects, the reconstruction loss may only differ slightly when ignoring these objects, creating local minima in which the objects are ignored. Moreover, for a camouflaged object, the background may have the same texture as the object, making it difficult to distinguish the object from the background based on only the reconstruction loss.

In accordance with aspects of the present disclosure, the encoder (e.g., 604) may be trained on the contrastive loss 612 rather than the reconstruction loss. That is, for object representations (e.g., 610) of frames in which the objects have equal features, object representation examples at like positions may be aligned, while maximizing the distance to all other object representation examples. A noise contrastive estimation may be used between two representations $z_i$ and $z_j$ in a batch of representations $\{z_k\}_1^{2N}$, which should be aligned, the noise contrastive estimation loss may be expressed as:

$$L_{i,j} = -\log \frac{\exp(sim(z_i, z_j)/\tau)}{\sum_{k=1}^{2N} \prod_{k \neq i} \exp(sim(z_i, z_j)/\tau)} \quad (1)$$

where sim is a similarity measure (e.g., cosine similarity) between two vectors, and $\tau$ represents a temperature parameter. The loss $L_{i,j}$ may be minimized by maximizing the similarity between $z_i$ and $z_j$, and minimizing the similarity of $z_i$ to all other representations in a batch. Thus, $z_j$ may be referred to as a positive example 614 of $z_i$, and all others may be considered negative examples 616.

Using this contrastive loss 612 results in learning representations that describe the objects in terms of their differences and similarities relative to other states of the environment. The contrastive loss 612 results may yield a more functional representation of the object than one that is learned through visual reconstruction (e.g., based on reconstruction loss).

In addition, the temporal processing allows the object representations 610 to model the object dynamics and interactions with the environment. This temporal processing yields representations that allow better reasoning of the current and future states of the environment.

FIG. 7 is a flow diagram illustrating an example process 700 for providing contrastive object-centric representation from temporal data, in accordance with aspects of the present disclosure. Referring to FIG. 7, at block 702, a setup procedure may be performed. In the setup procedure, a dataset of sequences from a dynamical system may be received. The dataset of sequences may, for instance, include a temporal sequence of frames of a video. Positive and negative example pairs may be generated based on the location in the sequence data (e.g., frames of the video). For instance, positive examples may be generated by taking two consecutive frames of the temporal sequence as positive examples to each other. This is because object features may not change substantially over time. In some aspects, a reverse of the temporal sequence may serve as a positive example to each frame. This is because object features may be time invariant, but may be detected with temporal information.

In another example, or by sampling objects, taking a different sequence whether the object is at the same location as the object in the other part of the frame pair. That is, the objects in the frame pair may have equal features, such as the same location or position in the frame pair, for instance. Negative examples, on the other hand, may be generated by sampling objects that are at different locations in the frame pair.

At block 704, the model architecture (e.g., architecture 600) may be trained. For example, the encoder 604 may be trained based on the contrastive loss 612 (e.g., as provided in Equation 1) on the received dataset. The contrastive loss 612 may be applied on object representations 610 generated by the encoder 604. The decoder (e.g., 508) may, in turn, be trained on the generated object representations to generate a reconstruction of an input (e.g., temporal sequence of frames) for visualization purposes, for example.

Thereafter, at block 706, the model architecture (e.g., 600) may operate to generate inferences. For example, the encoder 604 may receive an input (e.g., 602), such as a video including a temporal sequence of frames. The encoder (e.g., 604) may process the frames, for example, via successive layers of ConvLSTMs (e.g., 606a-c) to extract object-centric representations (e.g., 610) from the input (e.g., 602). As such, the architecture (e.g., 600) may represent objects in the video frames, such as objects that are camouflaged or hidden by the background environment or other objects may be detected.

As a result, aspects of the present disclosure may beneficially be applied in areas including autonomous vehicles (e.g., self-driving cars), object localization and environment mapping, video surveillance, as well as reasoning about objects via object-level representation, and distinguishing between dynamic objects and static objects.

Figure 8:
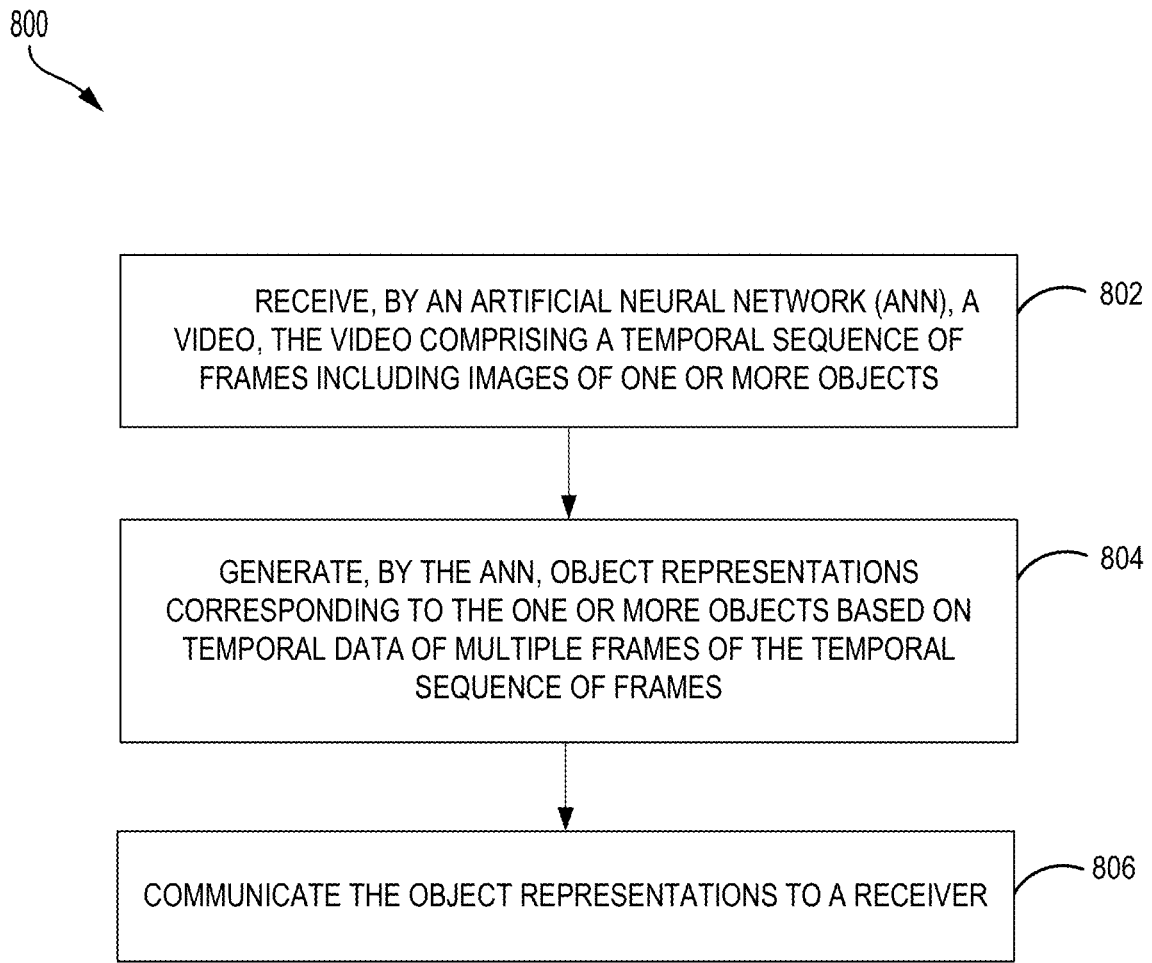
FIG. 8 is a flow diagram illustrating a computer-implemented method for contrastive object centric representation from temporal data using an artificial neural network, in accordance with aspects of the present disclosure.

FIG. 8 is a flow diagram illustrating a computer-implemented method 800 for contrastive object centric representation from temporal data using an artificial neural network (ANN), in accordance with aspects of the present disclosure. As shown in FIG. 8, at block 802, the method 800 receives, by the ANN, a video, the video comprising a temporal sequence of frames including images of one or more objects. For instance, as described with reference to FIG. 6, the architecture 600 may include an encoder 604. The encoder 604 may receive an input 602. The input 602 may comprise a temporal sequence of frames, such as a batch of images of a video. The encoder 604 may be configured with successive layers of convolutional long short-term memory (ConvLSTM) 604a-c. In the example of FIG. 6, three ConvLSTMs (e.g., 604a-c) are shown. However, this is merely an example and any number of ConvLSTM layers may be included according to design preference, for instance. The ConvLSTMs 604a-c integrate temporal information in the encoder 604 to enable the encoder 604 to generate an object-centric representation for the input 602.

At block 804, the method 800 generates, by the ANN, object representations corresponding to the one or more objects based on temporal data of multiple frames of the temporal sequence of frames. As described, for example, with reference to FIG. 6, encoder 604 may be configured with successive layers of convolutional long short-term memory (ConvLSTM) 606a-c. The ConvLSTMs 606a-c integrate temporal information in the encoder 604 to enable the encoder 604 to generate an object-centric representation for the input 602 including the temporal sequence of frames, such as a batch of images of a video. The ConvLSTMs 604a-c may utilize information of one or more previous frames of the video to generate object representations 610 for a current frame of the video.

At block 806, the method communicates the object representations to a receiver. For example, as described with reference to FIG. 5, the object representations 506 may be transmitted to the decoder 508.

Figure 9:
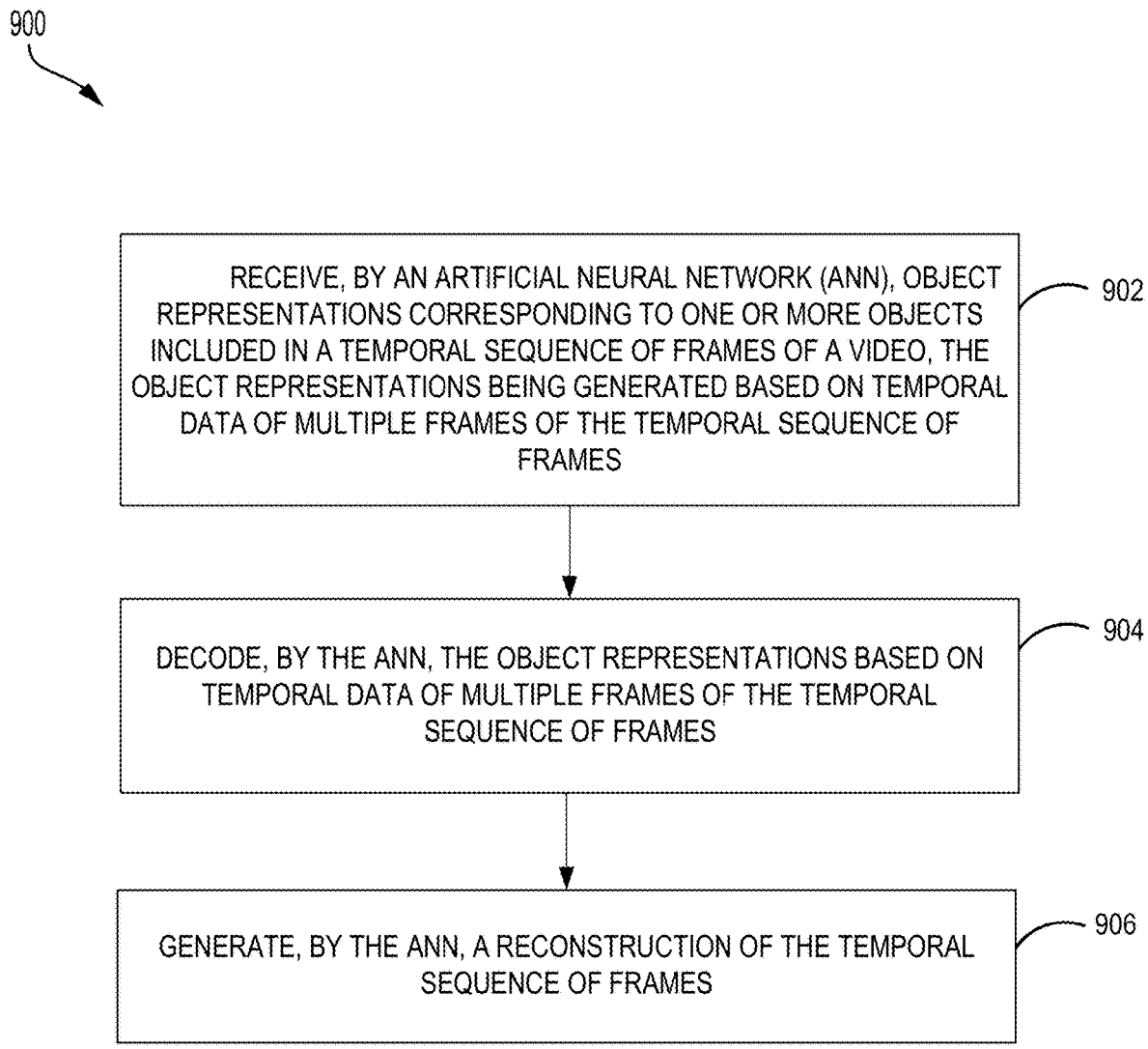
FIG. 9 is a flow diagram illustrating a computer-implemented method for processing contrastive object centric representation from temporal data using an artificial neural network, in accordance with aspects of the present disclosure.

FIG. 9 is a flow diagram illustrating a computer-implemented method 900 for processing contrastive object centric representation from temporal data using an artificial neural network (ANN), in accordance with aspects of the present disclosure. As shown in FIG. 9, at block 902, the method 900 receives, by the ANN, object representations corresponding to one or more objects included in a video. The object representations are generated based on temporal data of multiple frames of the temporal sequence of frames. For instance, as described with reference to FIG. 5, the decoder 508 receives object representations generated by encoder 504. The object representations correspond to objects included in one or more previous frames of the video.

At block 904, the method 900 decodes, by the ANN, the object representations based on temporal data of multiple frames of the temporal sequence of frames. As described with reference to FIG. 5, the decoder 508 may process the received object representations 506 to recover the object features and temporal information.

At block 906, the method 900 generates a reconstruction of the temporal sequence of frames. For example as described with reference to FIG. 5, the decoder may reconstruct the input 502 (e.g., a temporal sequence, such as a video).

Implementation examples are provided in the followed numbered clauses.

1. A computer-implemented method, comprising:
    receiving, by an artificial neural network (ANN), a video, the video comprising a temporal sequence of frames including images of one or more objects;
    generating, by the ANN, object representations corresponding to the one or more objects based on temporal data of multiple frames of the temporal sequence of frames; and
    communicating the object representations to a receiver.

2. The computer-implemented method of clause 1, in which the object representations are learned based on a contrastive loss.

3. The computer-implemented method of clause 1 or 2, in which the contrastive loss comprises a noise contrastive estimation.

4. The computer-implemented method of any of clauses 1-3, in which the one or more objects includes at least one image of an object that is camouflaged by a background environment.

5. The computer-implemented method of any of clauses 1-4, in which the ANN comprises a set of convolutional long short-term memory layers.

6. A computer-implemented method, comprising:
receiving, by an artificial neural network (ANN), object representations corresponding to one or more objects included in a video, the object representations being generated based on temporal data of multiple frames of the temporal sequence of frames;
decoding, by the ANN, the object representations based on temporal data of multiple frames of the temporal sequence of frames; and
generating, by the ANN, a reconstruction of the temporal sequence of frames.

7. The computer-implemented method of clause 6, in which the object representations are learned based on a contrastive loss.

8 The computer-implemented method of clause 6 or 7, in which the one or more objects includes at least one image of an object that is camouflaged by a background environment.

9. The computer-implemented method of any of clauses 6-8, further comprising generating an inference based on the object representations.

10. An apparatus comprising:
a memory; and
at least one processor coupled to the memory, the at least one processor configured:
to receive, by an artificial neural network (ANN), a video, the video comprising a temporal sequence of frames including images of one or more objects;
to generate, by the ANN, object representations corresponding to the one or more objects based on temporal data of multiple frames of the temporal sequence of frames; and
to communicate the object representations to a receiver.

11. The apparatus of clause 10, in which the object representations are learned based on a contrastive loss.

12. The apparatus of clause 10 or 11, in which the contrastive loss comprises a noise contrastive estimation.

13. The apparatus of any of clauses 10-12, in which the one or more objects includes at least one image of an object that is camouflaged by a background environment.

14. The apparatus of any of clauses 10-13, in which the ANN comprises a set of convolutional long short-term memory layers.

15. An apparatus comprising:
a memory; and
at least one processor coupled to the memory, the at least one processor configured:
to receive, by an artificial neural network (ANN), object representations corresponding to one or more objects included in a video, the object representations being generated based on temporal data of multiple frames of the temporal sequence of frames;
to decode, by the ANN, the object representations based on temporal data of multiple frames of the temporal sequence of frames; and
to generate, by the ANN, a reconstruction of the temporal sequence of frames.

16. The apparatus of clause 15, in which the object representations are learned based on a contrastive loss.

17. The apparatus of clause 15 or 16, in which the one or more objects includes at least one image of an object that is camouflaged by a background environment.

18. The apparatus of any of clauses 15-17, in which the at least one processor is further configured to generate an inference based on the object representations.

In one aspect, the receiving means, the generating means, communicating means, means for receiving, by the ANN, object representations, decoding means, and/or the means for generating a reconstruction may be the CPU 102, program memory associated with the CPU 102, the dedicated memory block 118, fully connected layers 362, NPU 428, and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A computer-implemented method, comprising:
   receiving, by an artificial neural network (ANN), a video, the video comprising a temporal sequence of frames including images of one or more objects, wherein the ANN comprises a first convolutional recurrent layer and a second convolutional recurrent layer;
   processing the temporal sequence of frames using the first convolutional recurrent layer and the second convolutional recurrent layer to extract a temporal shift of features between multiple frames of the temporal sequence of frames;
   generating, by the ANN, object representations corresponding to the one or more objects of a current frame based on at least one previous frame and the temporal shift of features between the multiple frames of the temporal sequence of frames, the ANN being configured to generate the object representations according to a noise contrastive estimation loss, wherein the object representations describe the one or more objects in accordance with differences or similarities in the one or more objects in an environment of the current frame of the video relative to the one or more objects in the environment of a different frame of the video; and
   communicating the object representations to a receiver.

2. The computer-implemented method of claim 1, in which the one or more objects includes at least one image of an object that is camouflaged by a background environment or partially occluded by another object.

3. The computer-implemented method of claim 1, in which the first and second convolutional recurrent layers are convolutional long short-term memory layers.

4. The computer-implemented method of claim 1, wherein the output of the first convolutional recurrent layer is provided as an input to the second convolutional recurrent layer.

5. A computer-implemented method, comprising:
   receiving, by an artificial neural network (ANN), object representations corresponding to one or more objects included in a current frame of a video, the object representations being generated based on at least one previous frame and the temporal shift of features between the multiple frames of the temporal sequence of frames, and wherein the ANN comprises a first convolutional recurrent layer and a second convolutional recurrent layer configured to process the temporal sequence of frames to extract the temporal shift of features between the multiple frames and to generate the object representations according to a noise contrastive estimation loss, wherein the object representations describe the one or more objects in accordance with differences or similarities in the one or more objects in an environment of the current frame of the video relative to the one or more objects in the environment of a different frame of the video;
   decoding, by the ANN, the object representations; and
   generating, by the ANN, a reconstruction of the temporal sequence of frames based on the decoded object representations.

6. The computer-implemented method of claim 5, in which the one or more objects includes at least one image of an object that is camouflaged by a background environment or partially occluded by another object.

7. The computer-implemented method of claim 5, further comprising generating an inference based on the object representations.

8. An apparatus comprising:
   at least one memory; and
   at least one processor coupled to the at least one memory, the at least one processor configured:
   to receive, by an artificial neural network (ANN), a video, the video comprising a temporal sequence of frames including images of one or more objects, wherein the ANN comprises a first convolutional recurrent layer and a second convolutional recurrent layer;
   to process the temporal sequence of frames using the first convolutional recurrent layer and the second convolutional recurrent layer to extract a temporal shift of features between multiple frames of the temporal sequence of frames;
   to generate, by the ANN, object representations corresponding to the one or more objects of a current frame based on at least one previous frame and the temporal shift of features between the multiple frames of the temporal sequence of frames, the ANN being configured to generate the object representations according to a noise contrastive estimation loss, wherein the object representations describe the one or more objects in accordance with differences or similarities in the one or more objects in an environment of the current frame of the video relative to the one or more objects in the environment of a different frame of the video; and to communicate the object representations to a receiver.

9. The apparatus of claim 8, in which the one or more objects includes at least one image of an object that is camouflaged by a background environment or partially occluded by another object.

10. The apparatus of claim 8, in which the ANN comprises a set of convolutional long short-term memory layers.

11. The apparatus of claim 8, wherein the output of the first convolutional recurrent layer is provided as an input to the second convolutional recurrent layer.

12. An apparatus comprising:

at least one memory; and at least one processor coupled to the at least one memory, the at least one processor configured:

to receive, by an artificial neural network (ANN), object representations corresponding to one or more objects included in a current frame of a video, the object representations being generated based on at least one previous frame and the temporal shift of features between the multiple frames of the temporal sequence of frames, and wherein the ANN comprises a first convolutional recurrent layer and a second convolutional recurrent layer configured to process the temporal sequence of frames to extract the temporal shift of features between the multiple frames and to generate the object representations according to a noise contrastive estimation loss, wherein the object representations describe the one or more objects in accordance with differences or similarities in the one or more objects in an environment of the current frame of the video relative to the one or more objects in the environment of a different frame of the video;

to decode, by the ANN, the object representations; and to generate, by the ANN, a reconstruction of the temporal sequence of frames based on the decoded object representations.

13. The apparatus of claim 12, in which the one or more objects includes at least one image of an object that is camouflaged by a background environment or partially occluded by another object.

14. The apparatus of claim 12, in which the at least one processor is further configured to generate an inference based on the object representations.

* * * * *